(No Model.)
J. B. McCUNE.
WHEEL.
No. 334,393. Patented Jan. 12, 1886.
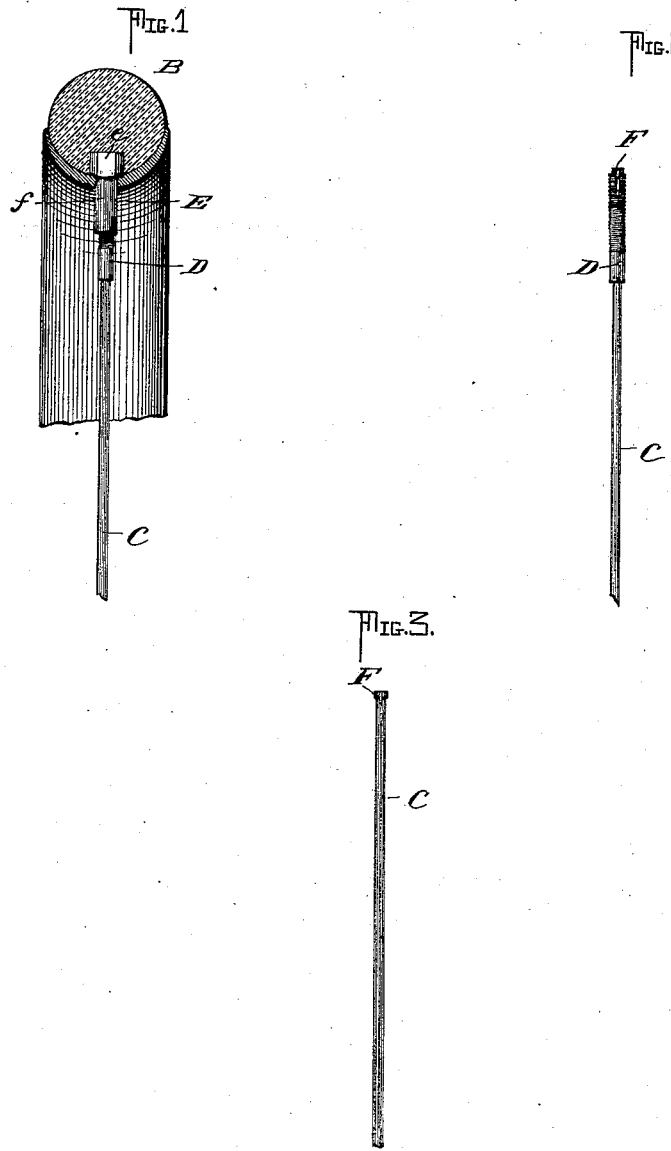
Witnesses.
Wm Rheem.
David H. Mead.
Joseph B. McCune Inventor.
By Wm Crew Intire Atty.

UNITED STATES PATENT OFFICE.

JOSEPH B. McCUNE, OF CHICOPEE, MASSACHUSETTS.

WHEEL.

SPECIFICATION forming part of Letters Patent No. 334,393, dated January 12, 1886.

Application filed October 5, 1885. Serial No. 179,014. (No model.)

*To all whom it may concern:*

Be it known that I, JOSEPH B. McCUNE, a citizen of the United States, residing at Chicopee, Massachusetts, have invented new and useful Improvements in Means for Fastening Spokes, of which the following is a specification.

This invention relates to vehicle-wheels, and particularly to means for fastening the spokes in wheels used upon "bicycles" and "tricycles," so called.

The most generally practiced method of securing the spokes in wheels of this kind is by cutting a screw-thread upon the end of the spoke and applying a nut directly thereto, the said nut bearing against the outer face of the tire, and serving when turned to give tension to the wire of which the spokes are formed, thus giving the proper strain to impart rigidity to the wheel. The cutting of this screw-thread materially weakens the spoke, as is evidenced by the fact that they most frequently break at the point where the screw-thread is placed; also, a comparatively large wire has to be used in order to allow the thread to be cut thereon without weakening the spoke sufficiently to render it useless.

The object of my invention is to produce a fastening for the spokes of a bicycle-wheel which will in no way weaken the same, and which may be renewed when worn without removing the spokes.

With these objects in view my invention consists in a fastening device for spokes, consisting of a sleeve of proper length placed upon the end of the spokes and retained thereon by means of an enlarged head or the like, the said sleeve being screw-threaded on its surface, and a nut adapted to be screwed upon the said sleeve and bear on the rim, against which it is forced to put tension upon the spokes.

In order that those skilled in the art to which my invention relates may know how to make and use the same, I will now proceed to describe it in connection with the accompanying drawings, in which—

Figure 1 is a sectional view showing a portion of the rim and tire of a bicycle-wheel and my improved spoke-attaching device in place. Fig. 2 is a detail view showing the end of a spoke and the sleeve which is placed thereon, and forms part of the attaching device; and Fig. 3 is a detail view showing the preferred shape of the end of a spoke upon which the sleeve is placed.

In the drawings, A represents a short section of the rim or felly of a bicycle-wheel as usually made, and B represents the tire, which is generally made of rubber and of a form to fit into the groove in the face of the felly.

C represents a spoke, which is preferably made of steel wire. In the general form of bicycle-wheels these spokes are provided with screw-threads, the cutting of which materially weakens the spoke. In my improved spoke the ends are "headed up" sufficiently to form a shoulder, against which a sleeve, D, bears, and the spokes are also preferably formed with one or more ribs or flanges, F, which enter slots in the sleeve D and prevent the said sleeve from turning independent of the spoke. The sleeve D is screw-threaded from its top downward to near its lower end, and its upper end is provided with slots G, into which enter the flanges from the spoke.

E represents a screw-cap, consisting of the octagonal head $e$ and the depending hollow and internally-screw-threaded portion $f$. This portion $f$ is of a size to receive the sleeve D, and the lower portion of the nut $e$ is slightly tapering, in order to conform to the curved shape of the outer portion of the tire, and thus present no sharp edges to the said felly.

Having thus described my invention, what I claim as new, and desire to secure by Letters Patent, is—

1. The fastening device for spokes, consisting of the spokes provided with enlarged heads and lateral flanges, the exteriorly-screw-threaded sleeves placed upon the spokes and provided with slots for the reception of the flanges upon the spoke, and the screw-cap receiving the end of the screw-threaded sleeve.

2. The combination, with the curved felly and the spokes provided with enlarged flanges, of the screw-threaded sleeves provided with slots for the reception of the flanges on the spokes, and the screw-caps consisting of the lower tubular portion and an operating nut-head, substantially as described.

3. The combination, with the curved felly and the spokes provided with enlarged ends and lateral flanges, of the screw-threaded sleeves provided with slots for the reception of the said flanges, and the tightening-nut inclosing the sleeve and having that part which bears upon the tire slightly tapering to conform to the shape of the tire.

In testimony whereof I have hereunto set my hand in the presence of two subscribing witnesses.

JOSEPH B. McCUNE.

Witnesses:
PRESTON C. POND,
WALTER W. BRADBURY.